B. R., C., AND R. S. BOLENBAUGH, AND L. W. LONG.
WHEEL CONSTRUCTION.
APPLICATION FILED FEB. 19, 1921.
1,408,258.
Patented Feb. 28, 1922.
2 SHEETS—SHEET 1.
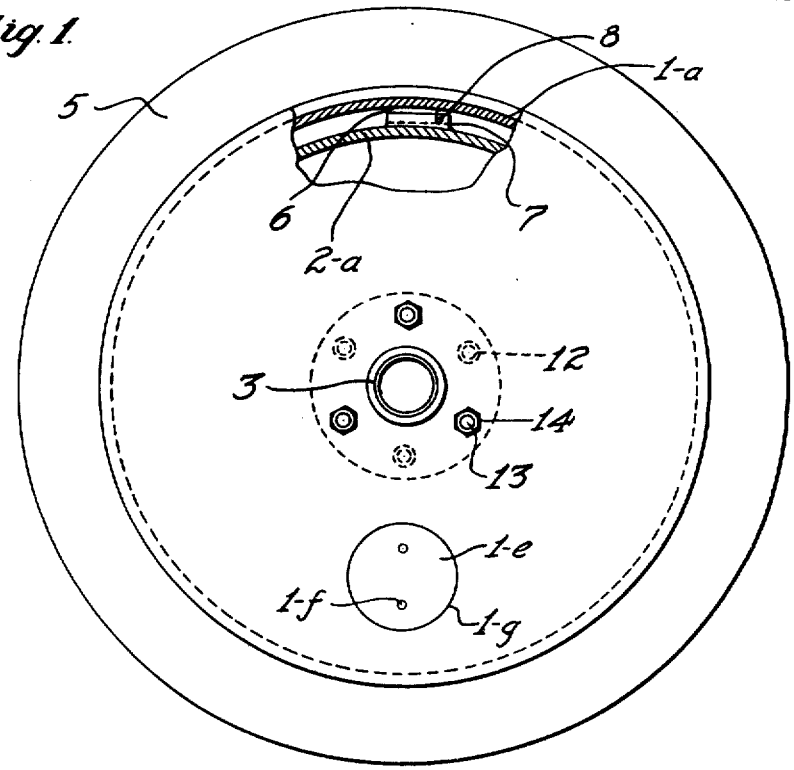
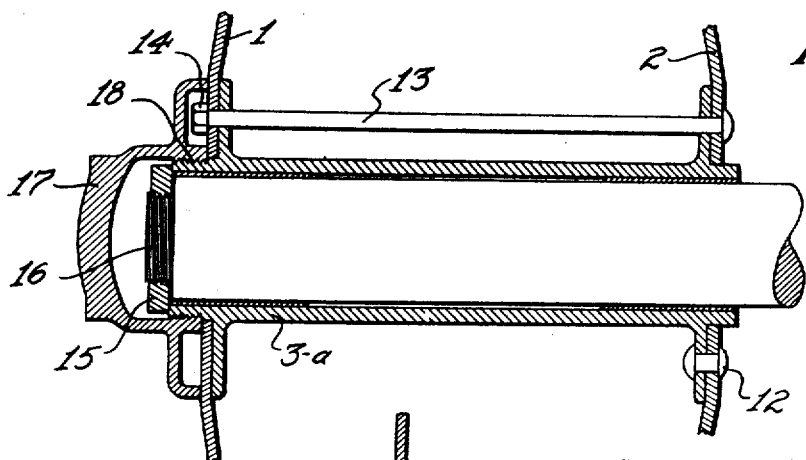
Burton R. Bolenbaugh,
Cyrus Bolenbaugh,
Ray S. Bolenbaugh,
Laurence W. Long.
INVENTORS
BY Victor J. Evans
ATTORNEY
WITNESSES

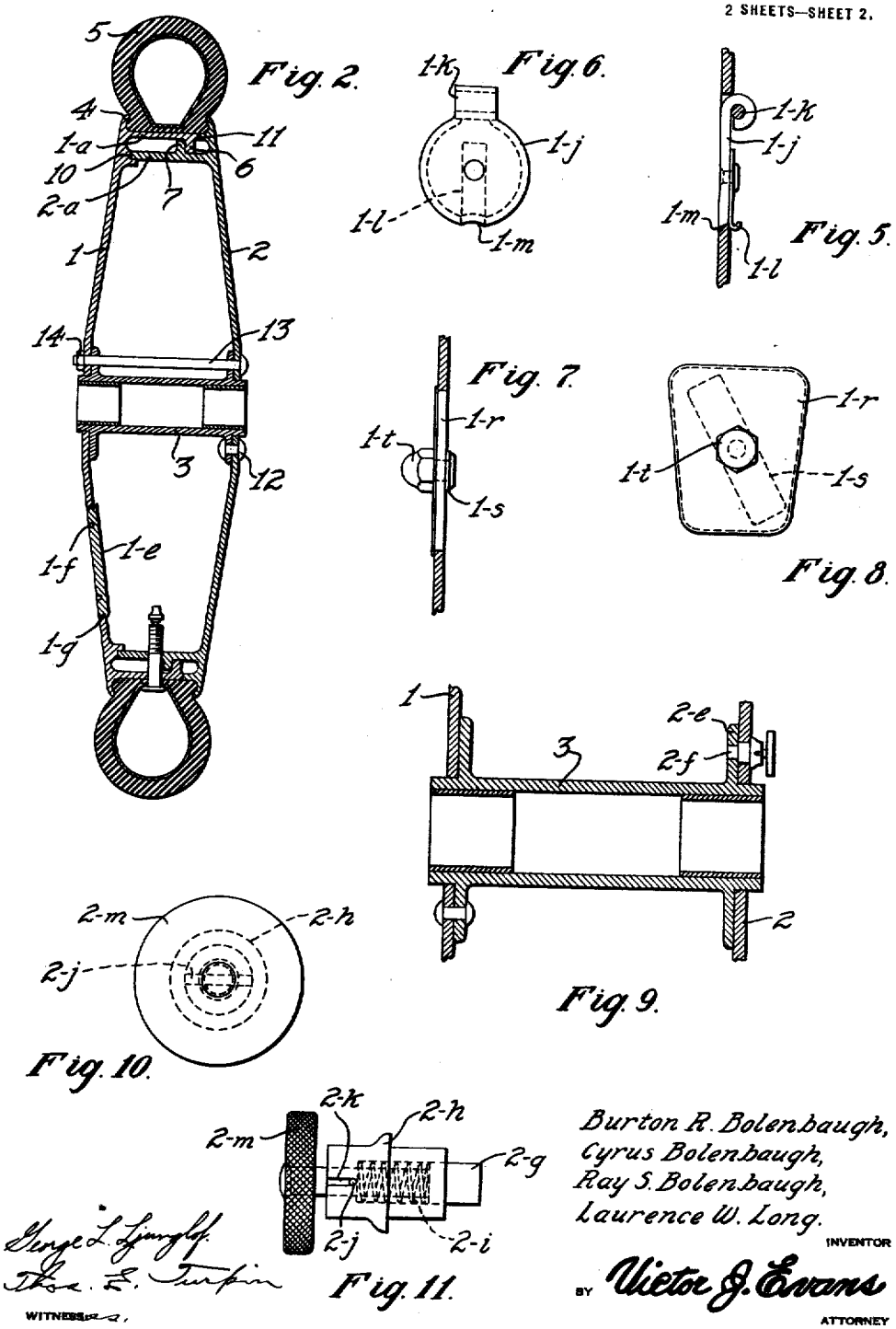

UNITED STATES PATENT OFFICE.

BURTON R. BOLENBAUGH, CYRUS BOLENBAUGH, RAY S. BOLENBAUGH, AND LAURENCE W. LONG, OF JACKSON, MICHIGAN, ASSIGNORS OF ONE-SIXTH TO ARTHUR PAULSON, OF NEW YORK, N. Y., ONE-SIXTH TO LAURENCE W. LONG, OF JACKSON, MICHIGAN, ONE-SIXTH TO HUGH E. KEELER, OF ANN ARBOR, MICHIGAN, ONE-SIXTH TO LEWIS H. FLYNN, OF ALBANY, NEW YORK, AND ONE-THIRD TO BURTON ROY BOLENBAUGH, CYRUS BOLENBAUGH, AND RAY SANFORD BOLENBAUGH.

WHEEL CONSTRUCTION.

1,408,258.  Specification of Letters Patent.  Patented Feb. 28, 1922.

Original application filed October 2, 1920, Serial No. 414,200. Divided and this application filed February 19, 1921. Serial No. 446,490.

*To all whom it may concern:*

Be it known that we, BURTON R. BOLENBAUGH, CYRUS BOLENBAUGH, RAY S. BOLENBAUGH, and LAURENCE W. LONG, citizens of the United States, residing at Jackson, in the county of Jackson and State of Michigan, have invented new and useful Improvements in Wheel Constructions, of which the following is a specification.

In common with the invention constituting the subject matter of our contemporary application filed Oct. 2, 1920, Serial No. 414,200, of which this application is a division, the present joint invention has for its object the provision of a wheel that is a practical improvement over those extant in respect to utility, durability and facility of manipulation.

To the attainment of the foregoing, the invention consists in the improvement as hereinafter described and definitely claimed.

In the accompanying drawings, forming part hereof:—

Figure 1 is a side elevation, partly in section, of one type of wheel constructed in accordance with our invention.

Figure 2 is a diametrical section of the same.

Figure 3 is a detail of a portion of the wheel.

Figures 4 to 8 are views of modifications hereinafter explicitly referred to.

Figures 9, 10 and 11 are views of another modification hereinafter explicitly referred to.

Similar numerals designate corresponding parts in Figures 1 to 3 to which reference will first be made.

By comparison of Figures 1 to 3 it will be observed that the wheel includes three major sections that are cast of an appropriate metal or alloy. The said sections are the two disks 1 and 2 and a hub 3 or 3ª. The disks 1 and 2 are equipped at 4 for the retention of a tire 5, and the said disks 1 and 2 are characterized by lugs 6 and 7, respectively, and one of the disks is also provided with a stop pin 8, Figure 1, having a limited movement in the other disk. In forming the wheel the two disks 1 and 2 are placed in opposed or superimposed relation and one of them is turned slightly through a part of a circle so that the locking lugs of one are circumferentially positioned directly behind the locking lugs of the other and with the working faces of the lugs extending circumferentially throughout. The effect of this is to strongly hold the disks together—i. e., against transverse separation, and so long as the disks 1 and 2 are held together it will be observed that the tire 5 will be securely held to the disks. The lugs 6 of the disk 1 are carried by a lateral flange 1ª of the said disk, and the lugs 7 of the disk 2 are carried by a lateral flange 2ª on the disk 2, said flanges radially spaced apart, and the stop pin 8 is carried on one of the said flanges to work within the other flange. The flanges 1ª and 2ª are arranged in spaced relation owing to the fact that the flange 2ª is of less diameter than the flange 1ª, and the edge of the flange of each disk bears solidly against the other disk as indicated by 10 and 11 with the result that each disk tends to press against and lend increased stiffness and strength to the other disk. The rear or back disk 2 is held to the hub 3 by means of rivets 12, and the other or front disk 1 may be held to the hub by any appropriate means. For instance in Figures 1 and 2 the disk 1 is held to the hub 3 through the medium of bolts 13 and nuts 14. When deemed expedient, however, the bolts 13 and the nuts 14 may be dispensed with, and the disks 1 and 2 may be held against turning and unlocking through the medium of the means shown in Figure 3, which means includes a hexagonal nut 15 threaded on an axle spindle 16, and a hub cap 17 of bronze or other appropriate metal threaded at 18 on the end of the hub 3ª and enclosing the hexagonal nut. Or if preferred the said means may be employed in association with the bolts 13 and nuts 14 as illustrated in Figure 3.

In Figures 1 and 2 it will be observed that one of the disks is provided with a valve opening—i. e., an opening to afford access to the valve through which the tire is inflated. The wall of the said opening is threaded, and in order to normally close the same we provide the plug disk 1$^e$; the said disk being peripherally threaded and being provided with sockets 1$^f$ whereby it may be readily turned into and out of the threaded opening which is indicated by 1$^g$. When in position the plug disk 1$^e$ rests flush with the outer side of the disk and does not detract in any measure from the finished appearance of the wheel.

We do not desire to be understood as confining ourselves to the specific manner just described of closing the valve opening. This will be better understood when it is stated that in Figures 4 to 8 are shown modified means for closing the opening.

The means shown in Figure 4 includes a beveled disk 1$^h$ and a diametrical spring 1$^i$ on said disk, the ends of the said spring 1$^i$ being shaped to engage the wheel disk and to hold the plug disk in working position until a prying instrument is operated against the edge of the plug disk to displace the same. In the modification shown in Figures 5 and 6 the plug disk 1$^j$ is hinged at 1$^k$ to the wheel disk and is equipped with a stiff spring 1$^l$. This stiff spring is riveted to the closure or plug disk in such manner as to hold the plug disk to the wheel disk when the former is closed. A slight groove 1$^m$ is formed in the disk 1$^j$ at a point opposite the hinge connection for the insertion of an implement with which to remove the plug disk. The hinge referred to is preferably formed by a pintle of the wheel disk, disposed in a barrel on the disk 1$^j$, Figures 5 and 6.

In Figures 7 and 8 the plug disk is numbered 1$^r$ and is shown as provided with a spring strip 1$^s$, riveted to a finger piece 1$^t$ that rests outside the plate so that by turning said finger piece the spring strip 1$^s$ will be positioned, see dotted lines in Figure 8, to lock or release the disk from the wheel disk.

In Figures 9, 10 and 11 we show a desirable modified means to hold the disks 1 and 2 such as shown in Figures 1 and 2 against turning on the hub 3, the said hub 3 being flanged. By particular reference to Figure 9 it will be observed that the hub flange 2$^e$ is provided with a transverse socket 2$^f$, and that one of the wheel disks, preferably the disk 2, carries what may be properly designated a stop pawl; the said stop pawl including a plunger 2$^g$, a casing 2$^h$, a spring 2$^i$ and a lug 2$^j$. The lug 2$^j$ is designed to be seated in a socket 2$^k$ in the casing. Thus in order to separate the wheel disks precedent to change in tires the plunger is first withdrawn from its socket in the hub flange. This may be conveniently accomplished by pulling on the knurled handle 2$^m$ after which the plunger is turned about its axis. When the plunger is so turned the lug will be out of alinement with the socket therefor, and hence the plunger will be retained out of engagement with the hub flange. To assemble the wheel the operation described is reversed, the knurled handle being turned so that the lug moves inwardly into its socket, thereby allowing the plunger to enter its socket in the hub flange so as to strongly lock the wheel disk against any movement with respect to the hub.

Having described our invention, what we claim and desire to secure by Letters-Patent, is:—

A wheel disk provided with a plain opening extending directly between opposite sides of the disk to afford access to the inflating valve of a tire, in combination with a removable plug-disk adapted to be seated in said opening and having a spring at its inner side to engage the wheel disk and yieldingly hold the plug-disk against casual displacement, said spring having a rounded end to snap past the wall of the opening and to engage the inner side of the disk on the insertion of the plug-disk.

In testimony whereof we affix our signatures.

BURTON R. BOLENBAUGH.
CYRUS BOLENBAUGH.
RAY S. BOLENBAUGH.
LAURENCE W. LONG.